US005576378A

United States Patent [19]
Kuhlmann et al.

[11] Patent Number: 5,576,378
[45] Date of Patent: Nov. 19, 1996

[54] HIGH TG POLYMER AND REDISPERSIBLE POWDER FOR USE IN HYDRAULIC PORTLAND CEMENT MORTAR AND CONCRETE

[75] Inventors: Louis A. Kuhlmann; James W. Young, Jr.; Daniel Moldovan, all of Midland, Mich.

[73] Assignee: The Dow Chemical Company, Midland, Mich.

[21] Appl. No.: 201,295

[22] Filed: Feb. 24, 1994

Related U.S. Application Data

[63] Continuation-in-part of Ser. No. 778,425, Oct. 16, 1991, abandoned.

[51] Int. Cl.$^6$ .............................. C08J 3/00; C08L 33/00; C08K 5/54; C08K 5/06
[52] U.S. Cl. .......................... 524/523; 524/267; 524/268; 524/375; 524/376; 524/492
[58] Field of Search .................................. 524/267, 268, 524/492, 375, 376, 523, 5, 8

[56] References Cited

U.S. PATENT DOCUMENTS

| | | | |
|---|---|---|---|
| 3,043,790 | 7/1962 | Sanders | 260/29.7 |
| 3,228,907 | 1/1966 | Eash | 260/297.7 |
| 3,354,169 | 11/1967 | Shafer et al. | 260/29.7 |
| 3,822,230 | 7/1974 | Nelson | 260/29.6 |
| 4,057,528 | 11/1977 | Hunt | 260/29.7 |
| 4,086,201 | 4/1978 | Peters et al. | 260/29.7 |
| 4,088,804 | 5/1978 | Cornwell et al. | 524/8 |
| 4,125,504 | 11/1978 | Mani et al. | 260/29.75 |
| 4,134,872 | 1/1979 | Lee . | |
| 4,151,150 | 4/1979 | Peters et al. | 260/29.7 |
| 4,156,669 | 5/1979 | Lee . | |
| 4,202,809 | 5/1980 | Eash | 260/29.7 |
| 4,263,191 | 4/1981 | Eck et al. | 524/5 |
| 4,340,510 | 7/1982 | Howanietz | 260/8 |
| 4,398,957 | 8/1983 | Ceska et al. | 106/90 |
| 4,767,460 | 8/1988 | Parcevaux et al. | 106/802 |
| 4,861,822 | 8/1989 | Keskey et al. . | |
| 4,863,979 | 9/1989 | Beyersdorf et al. . | |
| 4,960,810 | 10/1990 | Foster et al. | 524/265 |
| 5,087,656 | 2/1992 | Yoshinaga | 524/493 |
| 5,250,578 | 10/1993 | Cornwell | 521/83 |

FOREIGN PATENT DOCUMENTS

| | | | |
|---|---|---|---|
| 0393480 | 10/1990 | European Pat. Off. | C08F 259/08 |
| 0401200 | 12/1990 | European Pat. Off. . | |
| 0405084 | 1/1991 | European Pat. Off. . | |
| 134760 | 3/1979 | Germany | 106/728 |
| 52-26332 | 5/1977 | Japan | 524/8 |
| 490773 | 11/1975 | U.S.S.R. | 106/802 |

OTHER PUBLICATIONS

Yoshihiko Ohama et al, "Properties of Polymer–Modified Mortars Using Styrene–Butyl Acrylate Latexes with Various Monomer Ratios", ACI Materials Journal, Jan.–Feb. 1991, pp. 56–61.

Joseph A. Lavelle, "Acrylic Latex–Modified Portland Cement", ACI Materials Journal, Jan.–Feb. 1988, pp. 41–48.

Derwent Abstract, 95–000446/01, M. Angel et al., BASF AG.

Derwent abstract 83–46975K/20, DE 3143070–A, May 11, 1983.

Derwent abstract 76–30272X/17, DE 2445813–A, Apr. 15, 1976.

Derwent abstract 83–46976K/20, EP 0 078 449–A, May 11, 1983.

*Primary Examiner*—Paul R. Michl
*Assistant Examiner*—LaVonda R. DeWitt

[57] ABSTRACT

Polymers with a high glass transition temperature are used in cement additives to produce a portland cement mortar or concrete that does not have the initial stickiness typical of prior art polymer-modified portland cement compositions and does not form a crust on the surface when exposed to air drying, thus improving the working time of the mix. This simplifies equipment cleaning and permits the use of transit mixers for field applications of polymer-modified concrete. The properties of the mortar and concrete modified with these materials, both in the plastic and hardened state, are equivalent or superior to those of the currently available products which use film-forming materials. Within the scope of this invention are a redispersible powdered cement additive, a redispersible polymer powder and a ready-to-use portland cement composition, as well as related processes.

26 Claims, No Drawings

HIGH TG POLYMER AND REDISPERSIBLE POWDER FOR USE IN HYDRAULIC PORTLAND CEMENT MORTAR AND CONCRETE

CROSS-REFERENCE TO RELATED APPLICATION

This application is a continuation-in-part of U.S. Ser. No. 07/778,425, filed Oct. 1, 1991 now abandoned. The parent application is hereby incorporated by reference.

BACKGROUND OF THE INVENTION

1. Field of the Invention

The instant invention relates to a cement additive containing a high glass transition temperature (Tg) polymer available as a liquid or as a redispersible powder for use in polymer-modified hydraulic portland cement mortar and concrete, the polymer-modified hydraulic portland cement mortar and concrete made therewith, and a ready-to-use portland cement composition, as well as processes used to produce the cement additive, the redispersible powder and polymer-modified hydraulic portland cement mortar and concrete.

2. Description of Related Art

Latex has been used in cementitious mixtures since the 1920s when natural rubber latex was used to improve the flexibility and adhesion of various floor topping materials. Since that time many synthetic polymers have been developed for use in portland cement, such as styrene-butadiene, polyvinyl acetate, and a variety of acrylics.

The properties that each contributes to the hardened portland cement mixture vary with the properties of each polymer type, but all have a requirement that a stabilizer, usually a surfactant, be added to prevent coagulation of the latexes in the presence of the portland cement. The prior art latexes which have previously been used as cement additives typically have a glass transition temperature below 30° C. so that they form a film within the matrix of the hardened portland cement mixture. In the hardened state the film formed from the latex of the cement additive increases the tensile strength and the bond strength, and reduces the permeability of the portland cement composition.

It has been reported that in the wet state and the early stages of the hardened state of the portland cement mortar and concrete, the film formed from the latex of the cement additive impedes the passage of water vapor and maintains the high humidity conditions for the portland cement particles to cure properly. Therefore, the normal cure schedule for latex-modified cement compositions is one day of wet cure, with the remaining time exposed to air. This is in contrast to conventional, unmodified portland cement compositions which typically require seven days minimum of wet cure.

One of the drawbacks of latexes and other polymers that are film-forming at room temperature is that the mortar and concrete made with them is very difficult to clean from equipment if allowed to dry in air, even for a short time. In addition, when the surface of the wet mortar or concrete made with these latexes is exposed to air, a crust begins to form on the surface, which makes troweling and finishing difficult. These limitations not only reduce the time available for finishing, but also require that a special mixing machine, such as a mobile-mixer, be used when large quantities of latex-modified concrete are prepared in the field.

Most of the latexes used for modifying portland cement are not suitable for making into a dry, redispersible powder form. Because it has previously been assumed that film formation is a necessary requirement of a latex for it to provide the above-mentioned advantages when used as a cement additive in portland cement, latexes with a Tg of 30° C. or below have typically been used for this application. However, these latexes tend to be soft and clump together in the dry powder state, and, therefore, they require added agents to aid their redispersion in water. Such redispersion agents can degrade the final properties of the mortar and concrete.

In addition, additives are needed to prevent the low Tg latex particles from forming a film during the drying process to form a redispersible powder latex. Additives for the redispersible powder latex such as polyvinyl alcohol make the hardened mortar or concrete produced with these prior art additive-containing redispersible powder latexes susceptible to deterioration when exposed to moisture. This limits the use of the presently available redispersible powder latexes to those applications where moisture will not be present.

It would be desirable to have a cement additive containing a high Tg polymer that provides the advantageous properties of polymer modification when used in hydraulic portland cement or mortar without the prior art disadvantages mentioned above. Especially desirable would be a redispersible powdered polymer for use in a cement additive which does not have the disadvantages of the prior art low Tg redispersible powders.

SUMMARY OF THE INVENTION

The instant invention relates to a cement additive comprising:

(A) from about 70 to about 99 parts by weight of a polymer characterized by a Tg greater than 30° C., the polymer produced by polymerizing a polymerization mixture which contains monomers consisting essentially of one or more monomers selected from mono-unsaturated aromatic monomers, aliphatic conjugated diene monomers, esters of (meth)acrylic acid monomers, and monoethylenically unsaturated carboxylic acid monomers including the anhydrides, esters, amides and imides thereof; and, based on 100 parts of the polymer solids, (B) from about 1 to about 15 parts by weight of a stabilizer, and, (C) up to about 15 parts by weight of a foam depressant; or (A) from about 70 to about 99 parts by weight of a polymer characterized by a Tg greater than 45° C., the polymer produced by polymerizing a polymerization mixture which contains monomers comprising one or more monomers selected from mono-unsaturated aromatic monomers, aliphatic conjugated diene monomers, esters of (meth)acrylic acid monomers, and monoethylenically unsaturated carboxylic acid monomers including the anhydrides, esters, amides and imides thereof; and, based on 100 parts of the polymer solids, (B) from about 1 to about 15 parts by weight of a stabilizer, and, (C) up to about 15 parts by weight of a foam depressant.

Within the scope of the present invention is an embodiment wherein the cement additive further comprises up to 80 percent water and, thus, is a liquid, and an embodiment wherein the cement additive is in the form of a redispersible powder.

In another embodiment the instant invention relates to a process for the preparation of a cement additive comprising mixing together (A) from about 70 to about 99 parts by weight of a polymer characterized by a Tg greater than 30° C. wherein the polymer consists essentially of a polymerized mixture of one or more monomers selected from mono-unsaturated aromatic monomers, aliphatic conjugated diene monomers, esters of (meth)acrylic acid monomers, and monoethylenically unsaturated carboxylic acid monomers including the anhydrides, esters, amides and imides thereof; and, based on 100 parts of the polymer solids, (B) from about 1 to about 15 parts by weight of a stabilizer, and, (C) up to about 15 parts by weight of a foam depressant; or (A) from about 70 to about 99 parts by weight of a polymer characterized by a Tg greater than 45° C. wherein the polymer comprises a polymerized mixture of one or more monomers selected from mono-unsaturated aromatic monomers, aliphatic conjugated diene monomers, esters of (meth)acrylic acid monomers, and monoethylenically unsaturated carboxylic acid monomers including the anhydrides, esters, amides and imides thereof; and, based on 100 parts of the polymer solids, (B) from about 1 to about 15 parts by weight of a stabilizer, and, (C) up to about 15 parts by weight of a foam depressant.

In an important embodiment this process is accomplished in the presence of a liquid dispersant. A cement additive in the form of a redispersible powder is obtained by removing the liquid dispersant.

In still another embodiment this invention relates to a polymer modified portland cement concrete or mortar comprising portland cement and a cement additive comprising:

(A) from about 70 to about 99 parts by weight of a polymer characterized by a Tg greater than 30° C. wherein the polymer consists essentially of a polymerized mixture of one or more monomers selected from mono-unsaturated aromatic monomers, aliphatic conjugated diene monomers, esters of (meth)acrylic acid monomers, and monoethylenically unsaturated carboxylic acid monomers including the anhydrides, esters, amides and imides thereof; and, based on 100 parts of the polymer solids, (B) from about 1 to about 15 parts by weight of a stabilizer, and, (C) up to about 15 parts by weight of a foam depressant; or (A) from about 70 to about 99 parts by weight of a polymer characterized by a Tg greater than 45° C. wherein the polymer comprises a polymerized mixture of one or more monomers selected from mono-unsaturated aromatic monomers, aliphatic conjugated diene monomers, esters of (meth)acrylic acid monomers, and monoethylenically unsaturated carboxylic acid monomers including the anhydrides, esters, amides and imides thereof; and, based on 100 parts of the polymer solids, (B) from about 1 to about 15 parts by weight of a stabilizer, and, (C) up to about 15 parts by weight of a foam depressant, wherein the polymer modified portland cement concrete or mortar has been cured under ambient conditions.

Within the scope of the present invention is a process for the preparation of polymer modified portland cement concrete or mortar comprising:

(1) mixing together portland cement and a cement additive comprising:

(A) from about 70 to about 99 parts by weight of a polymer characterized by a Tg greater than 30° C. wherein the polymer consists essentially of a polymerized mixture of one or more monomers selected from mono-unsaturated aromatic monomers, aliphatic conjugated diene monomers, esters of (meth)acrylic acid monomers, and monoethylenically unsaturated carboxylic acid monomers including the anhydrides, esters, amides and imides thereof; and, based on 100 parts of the polymer solids, (B) from about 1 to about 15 parts by weight of a stabilizer, and, (C) up to about 15 parts by weight of a foam depressant, and (D) up to about 5 parts by weight of a water reducer; or (A) from about 70 to about 99 parts by weight of a polymer characterized by a Tg greater than 45° C. wherein the polymer comprises a polymerized mixture of one or more monomers selected from mono-unsaturated aromatic monomers, aliphatic conjugated diene monomers, esters of (meth)acrylic acid monomers, and monoethylenically unsaturated carboxylic acid monomers including the anhydrides, esters, amides and imides thereof; and, based on 100 parts of the polymer solids, (B) from about 1 to about 15 parts by weight of a stabilizer, and, (C) up to about 15 parts by weight of a foam depressant, and (D) up to about 5 parts by weight of a water reducer;

(2) curing the polymer modified portland cement concrete or mortar under ambient conditions.

A further embodiment of the instant invention is a redispersible polymer powder comprising:

(A) from about 70 to about 99 parts by weight of a polymer characterized by a Tg greater than 30° C. wherein the polymer consists essentially of a polymerized mixture of one or more monomers selected from mono-unsaturated aromatic monomers, aliphatic conjugated diene monomers, esters of (meth)acrylic acid monomers, and monoethylenically unsaturated carboxylic acid monomers including the anhydrides, esters, amides and imides thereof; and, based on 100 parts of the polymer solids, (B) from about 1 to about 15 parts by weight of a stabilizer, and, (C) up to about 15 parts by weight of a foam depressant; or (A) from about 70 to about 99 parts by weight of a polymer characterized by a Tg greater than 45° C. wherein the polymer comprises a polymerized mixture of one or more monomers selected from mono-unsaturated aromatic monomers, aliphatic conjugated diene monomers, esters of (meth)acrylic acid monomers, and monoethylenically unsaturated carboxylic acid monomers including the anhydrides, esters, amides and imides thereof; and, based on 100 parts of the polymer solids, (B) from about 1 to about 15 parts by weight of a stabilizer, and, (C) up to about 15 parts by weight of a foam depressant. Within the scope of this aspect of the instant invention is a process for the preparation of a redispersible polymer powder comprising mixing:

(A) from about 70 to about 99 parts by weight of a polymer characterized by a Tg greater than 30° C. wherein the polymer consists essentially of a polymerized mixture of one or more monomers selected from mono-unsaturated aromatic monomers, aliphatic conjugated diene monomers, esters of (meth)acrylic acid monomers, and monoethylenically unsaturated carboxylic acid monomers including the anhydrides, esters, amides and imides thereof; and, based on 100 parts of the polymer solids, (B) from about 1 to about 15 parts by weight of a stabilizer, and, (C) up to about 15 parts by weight of a foam depressant; or (A) from about 70 to about 99 parts by weight of a polymer characterized by a Tg greater than 45° C. wherein the polymer comprises a polymerized mixture of one or more monomers selected from mono-unsaturated aromatic monomers, aliphatic conjugated diene monomers, esters of (meth)acrylic acid monomers, and monoethylenically unsaturated carboxylic acid monomers including the anhydrides, esters, amides and imides thereof; and, based on 100 parts of the polymer solids, (B) from about 1 to about 15 parts by weight of a stabilizer, and, (C) up to about 15 parts by weight of a foam depressant, wherein the mixing is optionally accomplished in the presence of a liquid dispersant followed by removal of the liquid dispersant.

Still another embodiment of the instant invention is a ready-to-use portland cement composition which comprises portland cement and a cement additive comprising:

(A) from about 70 to about 99 parts by weight of a polymer characterized by a Tg greater than 30° C. wherein the polymer consists essentially of a polymerized mixture of one or more monomers selected from mono-unsaturated aromatic monomers, aliphatic conjugated diene monomers, esters of (meth)acrylic acid monomers, and monoethylenically unsaturated carboxylic acid monomers including the anhydrides, esters, amides and imides thereof; and, based on 100 parts of the polymer solids, (B) from about 1 to about 15 parts by weight of a stabilizer, and, (C) up to about 15 parts by weight of a foam depressant; or (A) from about 70 to about 99 parts by weight of a polymer characterized by a Tg greater than 45° C. wherein the polymer comprises a polymerized mixture of one or more monomers selected from mono-unsaturated aromatic monomers, aliphatic conjugated diene monomers, esters of (meth)acrylic acid monomers, and monoethylenically unsaturated carboxylic acid monomers including the anhydrides, esters, amides and imides thereof; and, based on 100 parts of the polymer solids, (B) from about 1 to about 15 parts by weight of a stabilizer, and, (C) up to about 15 parts by weight of a foam depressant. The addition of water and, optionally, aggregate and other typical additives to the portland cement composition produces polymer modified portland cement concrete or mortar.

In all the embodiments of this invention a blend of polymers with differing desirable characteristics, such as Tg, particle size and monomer composition, may be employed rather than a single polymer.

DESCRIPTION OF THE PREFERRED EMBODIMENTS

The present invention utilizes polymers such as the polymers in latexes that have a glass transition temperature above 30° C. so that they maintain their integrity as discreet polymer particles at room temperature. As such, they produce portland cement concrete or mortar that does not form a crust when exposed to air drying. Prior to final set, this mortar or concrete is readily cleaned from equipment with water. The physical properties of the hardened mortar and concrete made with these polymers is equivalent to, or better than, those of prior art products made with prior art polymers typically used as portland cement modifiers.

Although polymers with a Tg greater than 30° C. can be utilized in the instant invention, it is more desirable to utilize those with a Tg greater than 45° C. More highly desirable are polymers with a Tg greater than 60° C. and preferred are those with a Tg greater than 80° C., while even more highly preferred are polymers with a Tg greater than 100° C.

A preferred class of polymers are latex polymers and copolymers characterized by a Tg greater than 30° C., while even more highly preferred are those latex polymers and copolymers characterized by a Tg greater than 45° C. In a preferred embodiment the polymer is a latex polymer comprising a polymerized mixture of one or more mono-unsaturated aromatic monomers, aliphatic conjugated diene monomers, esters of (meth)acrylic acid monomers, and monoethylenically unsaturated carboxylic acid monomers including the anhydrides, esters, amides and imides thereof. The term "(meth)acrylic acid monomers" as used herein includes both the family of acrylic acid monomers and the family of methacrylic acid monomers. The term "carboxylic acid monomers" includes monomers with more than one carboxyl group, such as the diacids.

In more highly preferred embodiments the mono-unsaturated aromatic monomer is styrene, alphamethylstyrene, vinyltoluene, or a mixture thereof; the aliphatic conjugated diene monomer is butadiene, isoprene, or a mixture thereof; the ester of (meth)acrylic acid monomer is methyl methacrylate, methyl acrylate, n-butyl acrylate, sec-butyl acrylate, 2-hydroxyethyl acrylate, 2-ethylhexyl acrylate, or a mixture thereof; and the monoethylenically unsaturated carboxylic acid monomer is maleic acid, maleic anhydride, maleinimide, fumaric acid, itaconic acid, (meth)acrylic acid, crotonic acid or a mixture thereof.

A desirable polymer with a preferred Tg for use in the instant invention can be obtained from a polymerization of one or more monomers of a polymerization mixture wherein the polymerized mixture, based on 100 parts by dry weight of the monomers polymerized, comprises:

from about 85 to 99 parts of mono-unsaturated aromatic monomer and from about 1 to about 15 parts of monoethylenically unsaturated carboxylic acid monomer; or from about 75 to 99 parts of mono-unsaturated aromatic monomer and from about 1 to about 25 parts of aliphatic conjugated diene monomer; or from about 61 to 98 parts of mono-unsaturated aromatic monomer, from about 1 to about 24 parts of aliphatic conjugated diene monomer and from about 1 to about 15 parts of monoethylenically unsaturated carboxylic acid monomer; or from about 1 to 98 parts of mono-unsaturated aromatic monomer, from about 1 to about 30 parts of aliphatic conjugated diene monomer and from about 1 to about 98 parts of esters of (meth)acrylic acid monomer; or from about 1 to 97 parts of mono-unsaturated aromatic monomer, from about 1 to about 30 parts of aliphatic conjugated diene monomer, from about 1 to about 97 parts of esters of (meth)acrylic acid monomer and from about 1 to about 15 parts of monoethylenically unsaturated carboxylic acid monomer; or from about 1 to about 30 parts of aliphatic conjugated diene monomer and from about 1 to about 99 parts of esters of (meth)acrylic acid monomer; or from about 1 to about 30 parts of aliphatic conjugated diene monomer, from about 1 to about 98 parts of esters of (meth)acrylic acid monomer and from about 1 to about 15 parts of monoethylenically unsaturated carboxylic acid monomer; or from about 85 to about 99 parts of esters of (meth)acrylic acid monomer and from about 1 to about 15 parts of monoethylenically unsaturated carboxylic acid monomer; or from about 1 to 99 parts of mono-unsaturated aromatic monomer and from about 1 to about 99 parts of esters of (meth)acrylic acid monomer; or from about 1 to 98 parts of mono-unsaturated aromatic monomer and from about 1 to about 98 parts of esters of (meth)acrylic acid monomer and from about 1 to about 15 parts of monoethylenically unsaturated carboxylic acid monomer; or 100 parts of mono-unsaturated aromatic monomer; or 100 parts of esters of (meth)acrylic acid monomer.

Of the above polymerization mixtures the most preferred are those wherein the polymerized mixture, based on 100 parts by dry weight of the monomers polymerized, comprises:

from about 85 to 99 parts of mono-unsaturated aromatic monomer and from about 1 to about 15 parts of monoethylenically unsaturated carboxylic acid monomer; or from about 85 to about 99 parts of esters of (meth)acrylic acid monomer and from about 1 to about 15 parts of monoethylenically unsaturated carboxylic acid monomer.

In a preferred embodiment this invention provides a polymer, such as, for example, the preferred latex polymers and copolymers, which will form a powder upon drying at room temperature. This powder will not form clumps during storage, is substantially redispersed into water upon mixing therewith, and will make mortar or concrete that has properties similar to that made with the original polymer or latex.

The cement additives of this invention utilize polymers that have a glass transition temperature above 30° C., and which maintain their integrity as discreet polymer particles at room temperature. While not wishing to be bound by any particular theory regarding the mechanism by which the cement additive of this invention produces its advantages, it is thought that this mechanism must be quite different from that at work in products utilizing prior art polymer containing cement additives. It could be theorized that the latex or other polymer particles of this invention act as "pore fillers" within the portland cement matrix and thus improve the permeability properties, that is the impermeability, of the hardened mortar and concrete. On the other hand, conventional theory maintains that the prior art polymer containing cement additives, wherein the polymers have a glass transition temperature below 30° C., improve performance by the formation of a film.

It could also be theorized that, because the polymers of the present invention do not form a film at the working temperature of the mortar and concrete, a crust does not form on the surface of these materials as is the case with the film-forming latexes. This property of the latexes and other polymers of the instant invention surprisingly results in greatly simplified and improved mixing and finishing operations, as well as greater ease of equipment cleaning.

The appearance of the supposed pore blocking phenomenon, or other operative mechanism, quite early in the curing process provides another unexpected advantage of the cement additives of the instant invention over the prior art conventional mortar and concrete. Only one day of wet cure, similar to the film-forming latexes, was sufficient to produce acceptable mortar and concrete.

Latexes having a wide range of glass transition temperatures have been formulated with stabilizers, including preferably nonionic stabilizers, and successfully made into latex-modified mortar and concrete. In addition to the above-mentioned advantages and improvements, there was also a surprisingly unexpected improvement in bond strength.

All of the latex-modified mortar and concrete samples reported herein were cured according to the following schedule: 1 day at 100 percent relative humidity, 72° F. (22° C.); remaining time at 50 percent relative humidity, 72° F. (22° C). All conventional concrete samples were cured at 100 percent relative humidity, 72° F. (22° C.) until tested.

Portland cement mortar (hereinafter identified as LMM) was prepared and evaluated according to the following procedure: EXAMPLE 1

The following materials were used: The Portland cement was Type I from St. Mary's Peerless Cement Co., 9333 Dearborn Street, Detroit, Mich. 48209, and the concrete sand was 2NS, a natural, rounded river gravel with maximum size of 6.4 mm, from Fisher Sand and Gravel, 921 S. Jefferson, Midland, Mich. 48640, which meets the requirements of ASTM C 33 for gradation. The antifoam was Dow Corning 1520, available from Dow Corning Corporation, Midland, Mich. 48686. The stabilizer used was a nonionic surfactant butylphenoxypoly(ethyleneoxy)-ethanol. The latex used was Latex A, Table 4, which is a preferred latex, and which is a product of The Dow Chemical Company, Midland, Mich. 48640, sold under product number PP788.

The following apparatus was used:

a. Cone Penetrometer—as described in ASTM C 780, A1.2.6 b. Unit Measure—three 400 ml brass cups, as described in ASTM C 780, A1.2.6; each identified with a permanent marking c. Hobart mixer, model N-50 d. Timer—minimum capacity of 1 hour, and capable of 1 second accuracy e. Scoops—at least two required; one for the sand and cement, one for filling the Unit Measures; any suitably sized spoon may be used f. Tamping rod—a round, straight steel rod with at least the tamping end rounded to a hemispherical tip of the same diameter as the rod, ⅜ in. in diameter by approximately 12 in. long g. Mallet—a mallet with a rubber or rawhide head weighing approximately 1.25 lb.

h. Straightedge—at least 8 in. long i. Beakers—500 ml; two required, one for latex, one for water

| Portland Cement, Type I | 600 grams |
|---|---|
| Sand, 2NS | 1950 grams |
| Latex solids | 90 grams |
| Water | 222 grams |

After dry blending the cement and sand in the mixer, the latex and then the water were added and mixed.

Each unit measure was filled in three layers of approximately equal volume, rodding each layer 25 times with the tamping rod. After a measure had been filled, the sides were lightly tapped with the mallet once each at 5 different points of equal spacing around the outside of the measure in order to force out entrapped air. The mortar was cut off to a plane surface flush with the top of the measure by drawing the straight edge with a sawing motion across the top of the measure, making two passes over the entire surface, the second pass being made at right angles to the first.

Each filled measure was then weighed.

Each sample was covered carefully with plastic film to prevent moisture loss. At 9½ minutes after mixing started, one measure was uncovered and placed under the plunger of the Cone Penetrometer. The plunger was set on the edge of the measure and the set screw was tightened just enough to hold the plunger in position and move the indicator to opposite the zero point of the scale. After tightening the indicator the measure was centered under the plunger. At 10 minutes, the plunger was released with a swift, definite turn of the set screw while holding the entire apparatus with the other hand. The depth of cone penetration was read to the nearest millimeter.

The average net weight of the three Unit Measures is the mortar density, in grams/400 ml. The Vicat Penetration, in mm, is an indication of the workability of the mortar versus time.

Mortar mixes shown in Table 1 were evaluated. Compressive cubes were made according to ASTM C 109. Permeability was measured by AASHTO T-277-83 "Rapid Determination of the Chloride Permeability of Concrete."

TABLE 1

Latex-modified portland cement mortar (LMM):
Mix proportions:

| | parts, by weight | | | | |
|---|---|---|---|---|---|
| Portland cement | 1.00 | 1.00 | 1.00 | 1.00 | 1.00 |
| Sand | 3.25 | 3.25 | 3.25 | 3.25 | 3.25 |
| Latex A, solids | 0.15 | 0.15 | 0.15 | 0.15 | 0.15 |
| nonionic surfactant, active based on latex solids | 0.0575 | 0.024 | 0.08 | 0 | 0 |
| antifoam, active based on latex solids | 0.0027 | 0.0027 | 0.0027 | 0.0027 | 0.0027 |
| water | 0.37 | 0.37 | 0.37 | 0.37 | 0.50 |
| Properties | | | | | |
| Vicat Workability at 10 min., mm | 42 | 42 | 43 | 0 | 40 |
| mortar density, gm/400 ml | 874 | 816 | 872 | too stiff to | 811 |
| Compressive strength, MPa cured 1 day wet, 6 days dry | 41.8 | | | measure | |
| Permeability at 28 days coulombs | 1859 | | | | |
| % water absorbed during sample preparation | 0.52 | | | | |

Table 1 shows that with a normal level (approx. 6 percent) of nonionic surfactant as the stabilizer a mortar with good air entrainment (874 gm/400 ml density) and acceptable workability (42 mm Vicat) was achieved, and that this mortar has higher compressive strength than that produced with the Control styrene/butadiene (S/B) latex (see Table 4). Table 1 also shows that lower levels of the nonionic surfactant caused higher and unacceptable air content, whereas increasing the dosage of surfactant did not improve properties. Without nonionic surfactant the mortar was unacceptably stiff and unworkable. Permeability results at 28 days indicated lower than expected water absorption, but a typical coulomb value for latex-modified mortar.

Portland cement concrete (hereinafter identified as LMC) was prepared according to the following procedure:

EXAMPLE 2

Concrete was prepared by weighing out the following ingredients:

| Portland cement, Type I | 100 lbs. |
|---|---|
| Limestone, 25A | 170 lbs. |
| Concrete Sand, 2NS | 260 lbs. |
| Latex solids | 15 lbs. |
| Water | 37 lbs. |

The cement, sand and stone were added to the drum mixer and dry blended. The latex and water were then added and mixed for 1 minute. The mixer was turned off for 1 minute and then turned on for 3 more minutes. The concrete was discharged into a wheelbarrow from which samples were made while the mixer was cleaned with water.

Samples were made following ASTM C 192 procedures.

The concrete mixes and the properties of the resulting products are shown in Table 2.

TABLE 2

Latex-modified Portland Cement Concrete (LMC):
Mix proportions:

| | parts, by weight | |
|---|---|---|
| | Experimental Latex A | Control S/B latex (typical) |
| Portland cement | 1.00 | 1.00 |
| Stone | 1.7 | 1.7 |
| Sand | 2.6 | 2.6 |
| latex solids | 0.15 | 0.15 |
| nonionic surfactant, active based on latex | 0.0575 | 0.0575 |

TABLE 2-continued

Latex-modified Portland Cement Concrete (LMC):
Mix proportions:

|  | parts, by weight | |
| --- | --- | --- |
|  | Experimental Latex A | Control S/B latex (typical) |
| solids |  |  |
| antifoam, active based on latex solids | 0.0027 | 0.0027 |
| water | 0.37 | 0.37 |
| Properties |  |  |
| Slump, cm | 15 | 20 |
| Air content, % | 5.4 | 4.6 |
| Compressive strength, MPa |  |  |
| 1 day | 25.2 | 19.4 |
| 3 days | 34.3 | 26.4 |
| 7 days | 38.9 | 29.2 |
| 28 days | 46.7 | 34.7 |
| Tensile Bond Strength, MPa |  |  |
| 1 day | 1.46 | 0.83 |
| 3 days | 2.20 | 1.51 |
| 7 days | 2.03 | 1.96 |
| 28 days | 2.70 | 2.81 |
| Flexural Strength at 28 days, MPa | 4.0 | 6.6 |
| Permeability at 28 days, coulombs | 1615 | 1930 |
| Freeze/Thaw, ASTM C666, Procedure B |  |  |
| Durability Factor at 300 cycles | 100 | 100 |

The Portland cement was St. Mary's Type I; the stone was 25A, a crushed limestone with a maximum size of 9.5 mm; the sand was 2NS concrete sand. All of these materials are available from Fisher Sand and Gravel, Midland, Mich. 48640. The sand and stone meet the requirements of ASTM C 33 for gradation. The antifoam was Dow Corning 1520, available from Dow Corning Corporation, Midland, Mich. 48686. The surfactant was butylphenoxypoly(ethyleneoxy)-ethanol. The latex used was Latex A, which is a preferred latex, and which is a product of The Dow Chemical Company, Midland, Miss. 48640 sold under product number PP788. The control latex used for comparison in Table 2 was a commercially available styrene/butadiene latex with a Tg of 10° C., a product of The Dow Chemical Company, Midland, Mich. 48640, sold under product number DL460/NA.

Compressive specimens were made according to ASTM C 109; tensile bond specimens according to method described in ACI Materials Journal, July-August 1990, "Test Method for Measuring the Bond Strength of Latex-Modified Concrete and Mortar". Permeability was measured by AASHTO T-277-83 "Rapid Determination of the Chloride Permeability of Concrete". Slump was measured according to ASTM C 143, and air content was measured according to ASTM C 231.

Both the slump and air content of the experimental concrete were acceptable. The compressive and bond strengths exceeded those of the control latex-modified concrete. The permeability test indicated improved properties, for both water absorbed and coulomb values, compared to the control latex-modified concrete.

To further demonstrate the viability of these latexes in concrete, three more mixes were prepared in the laboratory, according to ASTM C 192. The results are shown in Table 3.

TABLE 3

Properties of Concrete Made With Latexes Having the Same High Tg but Different Particles Sizes

|  | Latex A | Latex B | 50/50 Blend-Latex A/B |
| --- | --- | --- | --- |
| Slump, cm | 14.6 | 14.6 | 14.0 |
| Air content, % | 6.5 | 5.5 | 5.6 |
| Compressive strength, MPa |  |  |  |
| 1 day | 23.7 | 28.5 | 27.4 |
| 3 days | 31.7 | 35.1 | 35.1 |
| 7 days | 37.9 | 40.8 | 39.5 |
| 28 days | 41.4 | 46.9 | 46.2 |
| Tensile Bond Strength, MPa |  |  |  |
| 1 day | 1.44 | 1.46 | 1.67 |
| 3 days | 1.87 | 1.85 | 2.33 |
| 7 days | 2.00 | 1.47 | 2.63 |
| 28 days | 2.60 | 1.25 | 2.74 |
| Shrinkage |  | see Table 5 |  |
| Permeability at 28 days, coulombs | 1850 | 1920 | — |

The compressive strength and tensile bond strength results are shown in Table 3. Table 4 shows data for a series of latexes with Tg greater than 30° C. and, for comparison, a control styrene/butadiene latex with a Tg of 10° C. In addition, shrinkage tests were conducted on of these latex-modified concretes and compared to the Control S/B and conventional concretes. These results are shown in Table 5. All the latexes in Table 4 were stabilized with approximately 6 weight percent, active to 30 active, surfactant D, Table 6.

TABLE 4

Various Latex Types Tested in Mortar

| Designation | Latex | Tg, C | Particle Size, A | Mortar density gm/400 ml | Vicat, mm at 10 min | Comp. Strength MPa at 7 days |
| --- | --- | --- | --- | --- | --- | --- |
| PP788, a Product of The Dow Chemical Co. | A | 109 | 1300 | 877 | 42 | 42.8 |
| PP722 a Product of The Dow Chemical Co. | B | 109 | 4500 | 888 | 44 | 45.5 |
| PP174, a Product of The Dow Chemical Co. | C | 109 | 2250 | 882 | 39 | 39.0 |
| XD-30756.50, a Product of The Dow Chemical Co. | D | 92 | 2200 | 876 | 34 | 41.5 |
| SC-30900.51, a Product of The Dow Chemical Co. | E | 47 | 1750 | 886 | 11 | — |
| DL421/NA, a Product of The Dow Chemical Co. | F | 57 | 2200 | 877 | 33 | 42.4 |
| XD-30776.50, a Product of The Dow Chemical Co. | G | 97 | 1400 | 881 | 52 | 41.0 |
| Experimental | H | 108 | 7000 | 887 | 49 | 43.6 |

TABLE 4-continued

Various Latex Types Tested in Mortar

| Designation | Latex | Tg, C | Particle Size, A | Mortar density gm/400 ml | Vicat, mm at 10 min | Comp. Strength MPa at 7 days |
|---|---|---|---|---|---|---|
| Experimental | I | 124 | 1110 | 902 | 87 | 48.3 |
| Experimental | J | 124 | 1110 | 891 | 38 | 40.4 |
| DL460/NA, a Product of The Dow Chemical Co. | Control S/B | 10 | 1900 | 885 | 85 | 37.9 |

TABLE 5

Percent Shrinkage of Concrete Made With Latexes A & B, Compared to Control S/B Latex and Conventional Concrete

| Time Days | Control S/B | Latex A | Latex B | 50/50 Latexes A/B | Conventional |
|---|---|---|---|---|---|
| 0 | 0 | 0 | 0 | 0 | 0 |
| 2 | −0.011 | −0.010 | −0.012 | −0.011 | −0.005 |
| 3 | −0.015 | −0.014 | −0.018 | −0.015 | −0.013 |
| 4 | −0.020 | −0.017 | −0.021 | −0.020 | −0.017 |
| 7 | −0.026 | −0.024 | −0.030 | −0.027 | −0.024 |
| 10 | −0.030 | | −0.038 | | −0.032 |
| 14 | −0.035 | −0.035 | −0.042 | −0.037 | −0.035 |
| 17 | −0.038 | | | | −0.038 |
| 21 | −0.041 | −0.041 | −0.049 | | |
| 28 | −0.044 | −0.048 | −0.053 | −0.048 | −0.044 |

Desirably the stabilizer is a nonionic, cationic, anionic, nonionic-anionic or polymerized surfactant, and preferably is a phenoxypoly(ethyleneoxy)-ethanol surfactant.

Latex A and others from Table 4 were stabilized with approximately 6 weight percent, active to active, butyl-, nonyl-, and octyl-, phenoxypoly(ethyleneoxy) ethanol surfactants and evaluated in mortar. There was a significant difference in the air entrainment (as measured by mortar density) and workability properties. The results of this evaluation are shown in Table 6.

TABLE 6

Effect of Type of Phenoxypoly(ethyleneoxy)--ethanol Surfactants in Experimental Latex A on the Properties of Mortar

| Mix | Surfactant Type | EO Groups | Mortar density grams/400 ml | Vicat, mm at 10 min | Comp. Strength MPa at 7 days |
|---|---|---|---|---|---|
| A | Nonyl | 100 | 781 | not tested | — |
| B | " | 10 | 855 | 49 | 38.5 |
| C | Octyl | 9 | 868 | 42 | 39.8 |
| D | Butyl | 10 | 876 | 51 | 41.8 |
| E | " | 40 | 792 | not tested | — |

Vicat workability and compressive strength were not measured on Mixes A & E because of excessive air entrainment. Of those tested completely, the butyl-with 10 ethylene oxide groups yielded the best performance, and, therefore, is preferred.

The term "foam depressant" as used herein is meant to include products which control the formation of entrained air which may occur during the mixing of portland cement mortar and concrete. It encompasses the terms "antifoam", "antifoamer" and "defoamer", as well as other terms which may be used for materials which perform this function. Preferred foam depressants are silicones and polyorganosiloxanes present in an amount from about 0.1 to about 5 parts by weight.

A water reducer was evaluated for compatibility as an additive to LMM made with the invention. An experimental mortar mix, with 0.20 weight percent, based on the weight of the cement, W. R. Grace WRDA water reducer added, was compared to a control mortar mix with the same latex and the same water to cement ratio. The results shown in Table 7, indicate compatibility and an improvement in mortar workability due to the addition of the water reducer.

TABLE 7

Evaluation of Water Reducer in LMM Using Latex A

| | Experimental Mix 0.20% water reducer weight %, based on cement | Control Latex A, Table 4 |
|---|---|---|
| Vicat, mm at 10 min. | 61 | 42 |
| Mortar density, gm/400 ml | 864 | 877 |
| Compressive Strength, MPa | 39.0 at 14 days | 42.8 at 7 days |

A proprietary rapid setting portland cement, Rapid Set® from CTS Cement Manufacturing Company, 337 Roscomare Rd., Suite 10, Los Angeles, Calif. A 90077, was used in LMM with Latex A and compared to LMM made with Control S/B latex (Table 4). The results, shown in Table 8, indicate that this proprietary cement is compatible with Latex A and produces higher compressive strength at 24 hours than the control.

TABLE 8

Evaluation of Rapid Set Cement in LMM Using Latex A

| | Experimental Mix Rapid Set Cement | S/B Control Table 4 |
|---|---|---|
| Vicat, mm at 10 min. | 35 | 74 |
| Mortar density, gm/400 ml | 870 | 876 |
| Compressive Strength, MPa at 24 hours | 38.7 | 34.5 |

Hollow synthetic pigments were evaluated as portland cement modifiers. A proprietary hollow synthetic pigment was stabilized with approximately 6 percent of Surfactant D (Table 5) and made into LMM. These test results, shown in Table 9, demonstrate the applicability of hollow synthetic pigments to this invention.

TABLE 9

Comparison of Mortar Made from Rohm & Haas OP 84 Hollow Synthetic Pigment and Latex A

| | Hollow Synthetic Pigment | Latex A Table 4 |
|---|---|---|
| Vicat, mm at 10 min. | 52 | 42 |
| Mortar density, gm/400 ml | 885 | 877 |
| Compressive Strength, MPa at 7 hours | 38.0 | 42.8 |

Different ratios of latex solids to cement for Latex A were evaluated in mortar. The results, shown in Table 10, show that levels from 5 percent to 20 percent can be used, with both workability and compressive strength properties varying with particular dosage selected.

TABLE 10

Properties of Mortar Made with Latex A at Different Latex Solids-Cement Ratios

| Latex Solids-cement | 5% | 15% | 20% |
|---|---|---|---|
| Vicat, mm | 24/19/12 | 73/56/48 | 75/63/53 |
| Mortar density, | 902 | 876 | 851 |
| Compressive Strength, MPa | | | |
| 1 day | 36.5 | 20.2 | 3.7 |
| 7 days | 53.6 | 44.2 | 22.8 |
| 28 days | 54.0 | 50.5 | 27.0 |

Redispersible Powders

Since the latexes used in the cement additives of the invention do not form a film at room temperature, it was decided to evaluate them as redispersible powders.
Example Latex A was stabilized with approximately 6 percent of Stabilizer D, poured into a pan to a depth of approximately ¼ inch and allowed to dry at room temperature for 2 days. The resultant material was ground into powder with a wooden tamper. The dry product was easily redispersed in water. Antifoam 1520 from Dow Corning Corporation, Midland, Mich. 48686, was added and the blend made into mortar according to the following recipe:

| | parts, by weight |
|---|---|
| Portland cement, St. Mary's Type I | 1.00 |
| Sand, 2NS | 3.25 |
| Stabilized Latex A, powder | 0.15 |
| Antifoam | 0.001 |
| Water | 0.37 |
| The mortar had the following properties: | |
| Vicat, mm at 10 min. | 42 |
| mortar density, gm/400 ml | 883 |
| Compressive Strength MPa at 7 days | 42.0 |

These values are comparable to mortar made with Latex A as an emulsion, indicating the feasibility of making a powder product. This was further demonstrated by passing the ground powder through a #30 sieve. The powder that passed through the sieve was mixed with Colloid 775DD, an antifoam powder from Rhone-Poulenc, Marietta, Ga., and used to prepare mortar in the following proportions:

| | parts, by weight |
|---|---|
| Portland cement, St. Mary's Type I | 1.00 |
| Sand, 2NS | 3.25 |
| Stabilized Latex A, powder | 0.15 |
| Antifoam powder | 0.015 |
| Water | 0.37 |
| The mortar had the following properties: | |
| Vicat, mm at 10 min. | 38 |
| mortar density, gm/400 ml | 880 |
| Compressive Strength MPa at 7 days | 46.0 |

These tests demonstrate the feasibility of making a redispersible powder with the latex of the invention.

Table 11 shows the results of an evaluation of the properties of a concrete made with a blend of 80 percent of Latex A and 20 percent of the Control S/B latex.

TABLE 11

Properties of Concrete Made with a Blend of 80% Latex A and 20% Control S/B.

| | Blend of 80 percent Latex A and 20 percent Control S/B | 100 percent Latex A |
|---|---|---|
| Slump, cm | 21 | 16.5 |
| Air Content, % | 4.6 | 4.9 |
| Compressive Strength, MPa | | |
| 1 day | 19.3 | 20.0 |
| 28 days | 44.5 | 46.3 |

Study of Moisture Content of Powder Made From Latex A

The moisture content of powder made from Latex A was determined by heating the sample for minutes at 160° C. Powder at three conditions was studied: (1) powder that had been made by air drying for hours at room temperature; (2) powder that had been stored at 50 percent R.H., 72° F. for 4 weeks; (3) powder that had been exposed to 100 percent R.H. for 48 hours. The results were:

| Condition 1 | 1.1% |
|---|---|
| Condition 2 | 8.2% |
| Condition 3 | 23.4% |

A wide variety of latexes having different monomer distributions and morphologies are suitable for the practice of this invention, so long as the latex is characterized by a Tg greater than 30° C. Of the representative latexes listed on Table 4 latexes A and I are preferred for use in the practice of this invention.

Preparation of various latexes useful for the practice of the invention are disclosed in the following U.S. Patents, which are hereby incorporated by reference: U.S. Pat. Nos. 4,863,979; 4,861,822; 4,156,669; 4,134,872; 4,151,150.

The Preparation of the Latexes

The latexes designated H, I, and J in Table 4 were produced using conventional emulsion polymerization techniques. Thus, for example, the monomers to be employed in the particular latex involved are typically dispersed, with agitation sufficient to emulsify the mixture, in an aqueous medium which may contain known emulsifying agents such as surfactants as well as other ingredients conventionally employed in the art as polymerization aids, including conventional chain transfer agents. Such monomers are then subjected to polymerization with the aid of a conventional source for generating free radicals including conventional free radical polymerization catalysts, activating radiation, or other means.

Free radical polymerization catalysts suitable for use in the foregoing polymerizations include those already known to promote emulsion polymerization. Among such catalysts are oxidizing agents such as organic peroxides such as t-butyl hydroperoxide and cumene hydroperoxide inorganic oxidizing agents such as hydrogen peroxide, potassium persulfate, sodium persulfate, ammonium persulfate and catalysts which, like redox catalysts, are activated in the water phase, for example, by a water-soluble reducing agent.

Such catalysts are employed in an amount sufficient to cause polymerization, i.e., in a catalytic amount. As a general rule, an amount ranging from about 0.01 to about 5 weight percent based upon the total monomer to be polymerized is sufficient. Alternatively, other free radical producing means, such as exposure to activating radiations, can be employed rather than heat and/or catalytic compounds to activate the polymerization.

Suitable emulsifying agents which can be employed include the anionic, cationic, and nonionic emulsifiers customarily used in emulsion polymerization. Usually at least one anionic emulsifier is included and one or more nonionic emulsifiers can also be present. Representative types of anionic emulsifiers are the alkyl aryl sulfonates, alkali, metal alkyl sulfates, the sulfonate alkyl esters, the fatty acid soaps, and the like. Specific examples of those well-known emulsifiers include dodecylbenzene sodium sulfonate, sodium butylnaphthalene sulfonate, sodium lauryl sulfate, disodium dodecyl diphenyl ether disulfonate, N-octadecyl disodium sulfosuccinate, and dioctyl sodium sulfosuccinate. Such emulsifying agents can be employed in varying amounts so long as adequate emulsification is achieved to provide dispersed polymer particles having the desired particle size and particle size distribution. However, as a general rule, an amount ranging from about 0.01 to about 5 weight percent, based upon the total monomer to be polymerized is advantageously employed.

As has been noted, conventional chain transfer agents can also be employed in the production of latexes and, indeed, in polymerization stages employing an aliphatic conjugated diene, it is preferable to do so. Examples are such long chain mercaptans such as lauryl mercaptan, dodecyl mercaptan, or other known chain transfer agents.

Other ingredients known in the art to be useful for various specific purposes in emulsion polymerization can also be employed in the aforementioned latexes, for example, when the polymerizable constituents for a given latex include a monoethylenically unsaturated carboxylic acid monomer, polymerization under acidic conditions, i.e., the aqueous media having pH value of from about 2 to 7, especially from about 2 to about 5, is preferred. In such instances, the aqueous medium can include acids and/or salts to provide the desired pH value and possibly a buffered system.

The latexes can be prepared by conventional emulsion polymerization techniques. Water and a seed latex or a micelle-forming surfactant are introduced into a reactor equipped with pumps to deliver monomer and aqueous feeds. The reactor is purged with nitrogen and heated. Over a period of several hours the monomer streams are added as well as a stream containing water, aqueous surfactant, and polymerization initiator. Following the addition of the monomer streams and the aqueous streams, the reaction mixture is maintained at the reaction temperature for additional reaction time to ensure extensive reaction before cooling. The latex is then steam distilled to reduce the concentration of unreacted monomers.

Examples

Latex H

This latex was prepared according to the procedure described below. Into a stainless steel jacketed reactor was charged mixture A, 27496 g (68.3 parts/100 parts monomer) of deionized water, 3031 g (3.6 parts) of a 47.8 percent active polystyrene seed having an average diameter of about 2250 angstroms, 201 g (0.5 parts) itaconic acid, and 29.4 g (0.03 parts) of a 41 percent solution of a chelating agent, Versenol 120, the trisodium salt of hydroxyethylethylenediamine triacetate, which is available from the Dow Chemical Company, Midland, Mich. 48640, in water. The reactor was purged with nitrogen and heated under agitation to 100RC. Monomers, comprising 39640 g (98.5 parts) styrene and 402 g (1 part) acrylic acid, were continuously added to the reactor, with 15.4 percent of the monomers added in 607 minutes and the remaining 84.6 percent in an additional 155 minutes. Also 12073 g (30 parts) of deionized water, 447 g (0.50 parts) of a 45 percent solution of Dowfax 2EP, the sodium salt of dodecylated sulfonated phenyl ether, which is available from the Dow Chemical Company, Midland, Mich. 48640, in water, 242 g (0.60 parts) sodium persulfate, and 48 g (0.12 parts) of sodium hydroxide were continuously added to the reaction, with 31 percent of this stream added in 60 minutes and the remaining 69 percent in an additional 175 minutes. Also, 982 g (2.4 parts) of deionized water and 201 g (0.5 parts) of sodium hydroxide were continuously added to the reactor beginning at 235 minutes and ending at 255 minutes. The reactor was maintained at 100° C. for the duration of the additions.

Latex I

This latex was prepared according to the procedure described below. Into a stainless steel jacketed reactor was charged mixture A, 1083.8 g (81.6 parts/100 parts monomer) of deionized water and 57.8 g (1.29 parts) of a 29.6 percent active polystyrene seed having an average diameter of about 259 angstroms. The reactor was purged with nitrogen and heated under agitation to 90° C. Monomers comprising 1275 g (96 parts) methyl methacrylate and 53.1 g (4 parts) acrylic acid, were continuously added to the reactor over 180 minutes. Also 531.0 g (40 parts) of deionized water, 14.8 g (0.50 parts) of a persulfate, and 6.6 g (0.1 parts) of a 20 percent solution of sodium hydroxide in water were continuously added to the reactor over 210 minutes. The reactor was maintained at 90° C. for the duration of the additions and for 30 minutes thereafter.

Latex J

This latex was prepared similar to Latex I except the monomers comprised 1221.4 g (92 parts) methyl methacrylate and 160.2 g (8 parts) acrylic acid.

What is claimed is:

1. A cement additive comprising:

(A) from about 70 to about 99 parts by weight of a polymer characterized by a Tg greater than 100° C., the polymer produced by polymerizing a polymerization mixture which contains monomers consisting essentially of one or more monomers selected from mono-unsaturated aromatic monomers, aliphatic conjugated diene monomers, esters of (meth)acrylic acid monomers, and monoethylenically unsaturated carboxylic acid monomers including the anhydrides, esters, amides and imides thereof; and, based on 100 parts of the polymer solids, (B) from about 1 to about 15 parts by weight of a stabilizer, and, (C) up to about 15 parts by weight of a foam depressant; or (A) from about 70 to about 99 parts by a Tg weight of a polymer characterized by greater than 1000° C., polymer produced by polymerizing a polymerization mixture which contains monomers comprising one or more monomers selected from mono-unsaturated aromatic monomers, aliphatic conjugated diene monomers, esters of (meth)acrylic acid monomers, and monoethylenically unsaturated carboxylic acid monomers including the anhydrides, esters, amides and imides thereof; and, based on 100 parts of the polymer solids, (B) from about 1 to about 15 parts by weight of a stabilizer, and, (C) up to about 15 parts by weight of a foam depressant.

2. The cement additive of claim 1 wherein the mono-unsaturated aromatic monomer is styrene, alphamethylstyrene, vinyltoluene, or a mixture thereof; the aliphatic conjugated diene monomer is butadiene, isoprene, or a mixture thereof; the ester of (meth)acrylic acid monomer is methyl methacrylate, methyl acrylate, n-butyl acrylate, sec-butyl acrylate, 2-hydroxyethyl acrylate, 2-ethylhexyl acrylate, or a mixture thereof; and the monoethylenically unsaturated carboxylic acid monomer is maleic acid, maleic anhydride, maleinimide, fumaric acid, itaconic acid, (meth)acrylic acid, crotonic acid or a mixture thereof.

3. The cement additive of claim 1 wherein the monomers of the polymerization mixture, based on 100 parts by dry weight of the monomers polymerized, consists essentially of:

from about 85 to 99 parts of mono-unsaturated aromatic monomer and from about 1 to about 15 parts of monoethylenically unsaturated carboxylic acid monomer; or from about 75 to 99 parts of mono-unsaturated aromatic monomer and from about 1 to about 25 parts of aliphatic conjugated diene monomer; or from about 61 to 98 parts of mono-unsaturated aromatic monomer, from about 1 to about 24 parts of aliphatic conjugated diene monomer and from about 1 to about 15 parts of monoethylenically unsaturated carboxylic acid monomer; or from about 1 to 98 parts of mono-unsaturated aromatic monomer, from about 1 to about 30 parts of aliphatic conjugated diene monomer and from about 1 to about 98 parts of esters of (meth)acrylic acid monomer; or from about 1 to 97 parts of mono-unsaturated aromatic monomer, from about 1 to about 30 parts of aliphatic conjugated diene monomer, from about 1 to about 97 parts of esters of (meth)acrylic acid monomer and from about 1 to about 15 parts of monoethylenically unsaturated carboxylic acid monomer; or from about 1 to about 30 parts of aliphatic conjugated diene monomer and from about 1 to about 99 parts of esters of (meth)acrylic acid monomer; or from about 1 to about 30 parts of aliphatic conjugated diene monomer, from about 1 to about 98 parts of esters of (meth)acrylic acid monomer and from about 1 to about 15 parts of monoethylenically unsaturated carboxylic acid monomer; or from about 85 to about 99 parts of esters of (meth)acrylic acid monomer and from about 1 to about 15 parts of monoethylenically unsaturated carboxylic acid monomer; or from about 1 to 99 parts of mono-unsaturated aromatic monomer and from about 1 to about 99 parts of esters of (meth)acrylic acid monomer; or from about 1 to 98 parts of mono-unsaturated aromatic monomer and from about 1 to about 98 parts of esters of (meth)acrylic acid monomer and from about 1 to about 15 parts of monoethylenically unsaturated carboxylic acid monomer; or 100 parts of mono-unsaturated aromatic monomer; or 100 parts of esters of (meth)acrylic acid monomer.

4. The cement additive of claim 3 wherein the monomers of the polymerization mixture, based on 100 parts by dry weight of the monomers polymerized, consists essentially of:

from about 85 to 99 parts of mono-unsaturated aromatic monomer and from about 1 to about 15 parts of monoethylenically unsaturated carboxylic acid monomer; or from about 85 to about 99 parts of esters of (meth)acrylic acid monomer and from about 1 to about 15 parts of monoethylenically unsaturated carboxylic acid monomer.

5. The cement additive of claim 1 wherein the stabilizer is a nonionic, cationic, anionic, nonionic-anionic or polymerized surfactant.

6. The cement additive of claim 5 wherein the stabilizer is an alkyl substituted phenoxypoly(ethyleneoxy)ethanol surfactant.

7. The cement additive of claim 1 wherein the foam depressant is a silicone or a polyorganosiloxane present in an amount of from about 0.1 to about 5 parts by weight.

8. The cement additive of claim 1 further comprising a mixture of polymers.

9. The cement additive of claim 1 further comprising up to about 80 percent water.

10. The cement additive of claim 1 in the form of a redispersible powder.

11. A redispersible polymer powder comprising:

(A) from about 70 to about 99 parts by weight of a polymer characterized by a Tg greater than 80° C. wherein the polymer consists essentially of a polymerized mixture of one or more monomers selected from mono-unsaturated aromatic monomers, aliphatic conjugated diene monomers, esters of (meth)acrylic acid monomers, and monoethylenically unsaturated carboxylic acid monomers including the anhydrides, esters, amides and imides thereof; and, based on 100 parts of the polymer solids, (B) from about 1 to about 15 parts by weight of a stabilizer, and, (C) up to about 15 parts by weight of a foam depressant; or (A) from about 70 to about 99 parts by weight of a polymer characterized by a Tg greater than 80° C. wherein the polymer comprises a polymerized mixture of one or more monomers selected from mono-unsaturated aromatic monomers, aliphatic conjugated diene monomers, esters of (meth)acrylic acid monomers, and monoethylenically unsaturated carboxylic acid monomers including the anhydrides, esters, amides and imides thereof; and, based on 100 parts of the polymer solids, (B) from about 1 to about 15 parts by weight of a stabilizer, and, (C) up to about 15 parts by weight of a foam depressant.

12. A process for the preparation of a redispersible polymer powder comprising mixing:

(A) from about 70 to about 99 parts by weight of a polymer characterized by a Tg greater than 80° C. wherein the polymer consists essentially of a polymerized mixture of one or more monomers selected from mono-unsaturated aromatic monomers, aliphatic conjugated diene monomers, esters of (meth)acrylic acid monomers, and monoethylenically unsaturated carboxylic acid monomers including the anhydrides, esters, amides and imides thereof; and, based on 100 parts of the polymer solids, (B) from about 1 to about 15 parts by weight of a stabilizer, and, (C) up to about 15 parts by weight of a foam depressant; or (A) from about 70 to about 99 parts by weight of a polymer characterized by a Tg greater than 80° C. wherein the polymer comprises a polymerized mixture of one or more monomers selected from mono-unsaturated aromatic monomers, aliphatic conjugated diene monomers, esters of (meth)acrylic acid monomers, and monoethylenically unsaturated carboxylic acid monomers including the anhydrides, esters, amides and imides thereof; and, based on 100 parts of the polymer solids, (B) from about 1 to about 15 parts by weight of a stabilizer, and, (C) up to about 15 parts by weight of a foam depressant, wherein the mixing is optionally accomplished in the presence of a liquid dispersant followed by removal of the liquid dispersant.

13. A cement additive comprising:

(A) from about 70 to about 99 parts by weight of a polymer characterized by a Tg greater than 100° C., the polymer being produced by polymerizing a polymerization mixture which contains monomers consisting essentially of one or more monomers selected from styrene, alphamethylstyrene, vinyltoluene, butadiene, isoprene, methyl methacrylate, methyl acrylate, n-butyl acrylate, sec-butyl acrylate, 2-hydroxyethyl acrylate, 2-ethylhexyl acrylate, maleic acid, maleic anhydride, maleinimide, fumaric acid, itaconic acid, (meth)acrylic acid, and crotonic acid including the anhydrides, esters, amides and imides thereof; and, based on 100 parts of the polymer solids, (B) from about 1 to about 15 parts by weight of an alkyl substituted phenoxypoly(ethyleneoxy)ethanol surfactant stabilizer, and, (C) up to about 15 parts by weight of a silicone or a polyorganosiloxane foam depressant.

14. The cement additive of claim 13 wherein the monomer comprises at least styrene and butadiene.

15. A cement additive comprising:

(A) from about 70 to about 99 parts by weight of a polymer characterized by a Tg greater than 100° C., the polymer being produced by polymerizing a polymerization mixture comprising one or more monomers selected from styrene, alphamethylstyrene, vinyltoluene, butadiene, isoprene, methyl methacrylate, methyl acrylate, n-butyl acrylate, sec-butyl acrylate, 2-hydroxyethyl acrylate, 2-ethylhexyl acrylate, maleic acid, maleic anhydride, maleinimide, fumaric acid, itaconic acid, (meth)acrylic acid, crotonic acid including the anhydrides, esters, amides and imides thereof; and, based on 100 parts of the polymer solids, (B) from about 1 to about 15 parts by weight of an alkyl substituted phenoxypoly(ethyleneoxy)ethanol surfactant stabilizer, and, (C) up to about 15 parts by weight of a silicone or a polyorganosiloxane foam depressant.

16. A cement additive comprising:

(A) from about 70 to about 99 parts by weight of a polymer characterized by a Tg greater than 100° C., the polymer produced by polymerizing a polymerization mixture which contains monomers consisting essentially of two or more monomers selected from mono-unsaturated aromatic monomers, aliphatic conjugated diene monomers, esters of (meth)acrylic acid monomers, and monoethylenically unsaturated carboxylic acid monomers including the anhydrides, esters, amides and imides thereof; and, based on 100 parts of the polymer solids, (B) from about 1 to about 15 parts by weight of a stabilizer, and, (C) up to about 15 parts by weight of a foam depressant.

17. The cement additive of claim 16 wherein the stabilizer is an alkyl substituted phenoxypoly(ethyleneoxy)ethanol surfactant.

18. The cement additive of claim 16 wherein the foam depressant is a silicone or a polyorganosiloxane present in an amount of from about 0.1 to about 5 parts by weight.

19. The cement additive of claim 17 wherein the foam depressant is a silicone or a polyorganosiloxane present in an amount of from about 0.1 to about 5 parts by weight.

20. The cement additive of claim 16 wherein the mono-unsaturated aromatic monomer is styrene, alphamethylstyrene, vinyltoluene, or a mixture thereof; the aliphatic conjugated diene monomer is butadiene, isoprene, or a mixture thereof; the ester of (meth)acrylic acid monomer is methyl methacrylate, methyl acrylate, n-butyl acrylate, sec-butyl acrylate, 2-hydroxyethyl acrylate, 2-ethylhexyl acrylate, or a mixture thereof; and the monoethylenically unsaturated carboxylic acid monomer is maleic acid, maleic anhydride, maleinimide, fumaric acid, itaconic acid, (meth)acrylic acid, crotonic acid or a mixture thereof.

21. The redispersible powder of claim 11 wherein the polymer consists essentially of a polymerized mixture of one or more monomers selected from mono-unsaturated aromatic monomers, aliphatic conjugated diene monomers, esters of (meth)acrylic acid monomers, and monoethylenically unsaturated carboxylic acid monomers including the esters, amides and imides thereof; and, based on 100 parts of the polymer solids.

22. The redispersible powder of claim 21 wherein the polymer is characterized by a Tg greater than 100° C.

23. The redispersible powder of claim 11 wherein the polymer is characterized by a Tg greater than 100° C.

24. The process of claim 12 wherein the polymer has a Tg greater than 100° C.

25. The process of claim 12 wherein the polymer consists essentially of a polymerized mixture of one or more monomers selected from mono-unsaturated aromatic monomers, aliphatic conjugated diene monomers, esters of (meth)acrylic acid monomers, and monoethylenically unsaturated carboxylic acid monomers including the, esters, amides and imides thereof; and, based on 100 parts of the polymer solids.

26. The process of claim 25 wherein the polymer has a Tg greater than 100° C.

* * * * *

UNITED STATES PATENT AND TRADEMARK OFFICE
CERTIFICATE OF CORRECTION

PATENT NO. : 5,576,378
DATED : Nov. 19, 1996
INVENTOR(S) : Kuhlmann et al.

It is certified that error appears in the above-identified patent and that said Letters Patent is hereby corrected as shown below:

Col. 18, line 56, please delete "a Tg."
Col. 18, line 57, please delete "greater than 1000°C.," and replace with -- a Tg greater than 100°C, the --.

Signed and Sealed this

Twenty-ninth Day of June, 1999

Attest:

Attesting Officer

Q. TODD DICKINSON

Acting Commissioner of Patents and Trademarks